(12) United States Patent
Goto et al.

(10) Patent No.: US 11,981,108 B2
(45) Date of Patent: May 14, 2024

(54) Ni-PLATED STEEL SHEET AND MANUFACTURING METHOD THEREOF

(71) Applicant: NIPPON STEEL CORPORATION, Tokyo (JP)

(72) Inventors: Yasuto Goto, Tokyo (JP); Kiyokazu Ishizuka, Tokyo (JP); Tatsuo Nagata, Tokyo (JP); Katsumasa Matsumoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/796,643

(22) PCT Filed: Mar. 1, 2021

(86) PCT No.: PCT/JP2021/007671
§ 371 (c)(1),
(2) Date: Jul. 30, 2022

(87) PCT Pub. No.: WO2021/107161
PCT Pub. Date: Jun. 3, 2021

(65) Prior Publication Data
US 2023/0072743 A1    Mar. 9, 2023

(30) Foreign Application Priority Data
Mar. 3, 2020  (JP) ................................. 2020-035830

(51) Int. Cl.
*B32B 15/01*  (2006.01)
*C22C 19/03*  (2006.01)
*C25D 3/56*  (2006.01)
*C25D 5/50*  (2006.01)

(52) U.S. Cl.
CPC ............ *B32B 15/015* (2013.01); *C22C 19/03* (2013.01); *C25D 3/562* (2013.01); *C25D 5/50* (2013.01); *Y10T 428/12937* (2015.01); *Y10T 428/12944* (2015.01); *Y10T 428/12951* (2015.01)

(58) Field of Classification Search
None
See application file for complete search history.

(56) References Cited

U.S. PATENT DOCUMENTS

2018/0351138 A1\* 12/2018 Asada ..................... B32B 15/04
2019/0230939 A1\* 8/2019 Jiraschek ................. A21B 3/13

FOREIGN PATENT DOCUMENTS

| JP | 05025600 A | \* | 2/1993 |
| WO | 01/42537 A1 | | 6/2001 |

\* cited by examiner

*Primary Examiner* — Xiaobei Wang
(74) *Attorney, Agent, or Firm* — Renner, Otto, Boisselle & Sklar, LLP

(57) ABSTRACT

A Ni-plated steel sheet according to one aspect of the present invention includes a base steel sheet; and a Ni plating layer provided on a surface of the base steel sheet, wherein the Ni plating layer includes a Ni—Fe alloy layer formed on the surface of the base steel sheet, and a ratio of a Sn content to a Ni content in the Ni plating layer is 0.0005% to 0.10%.

11 Claims, 3 Drawing Sheets

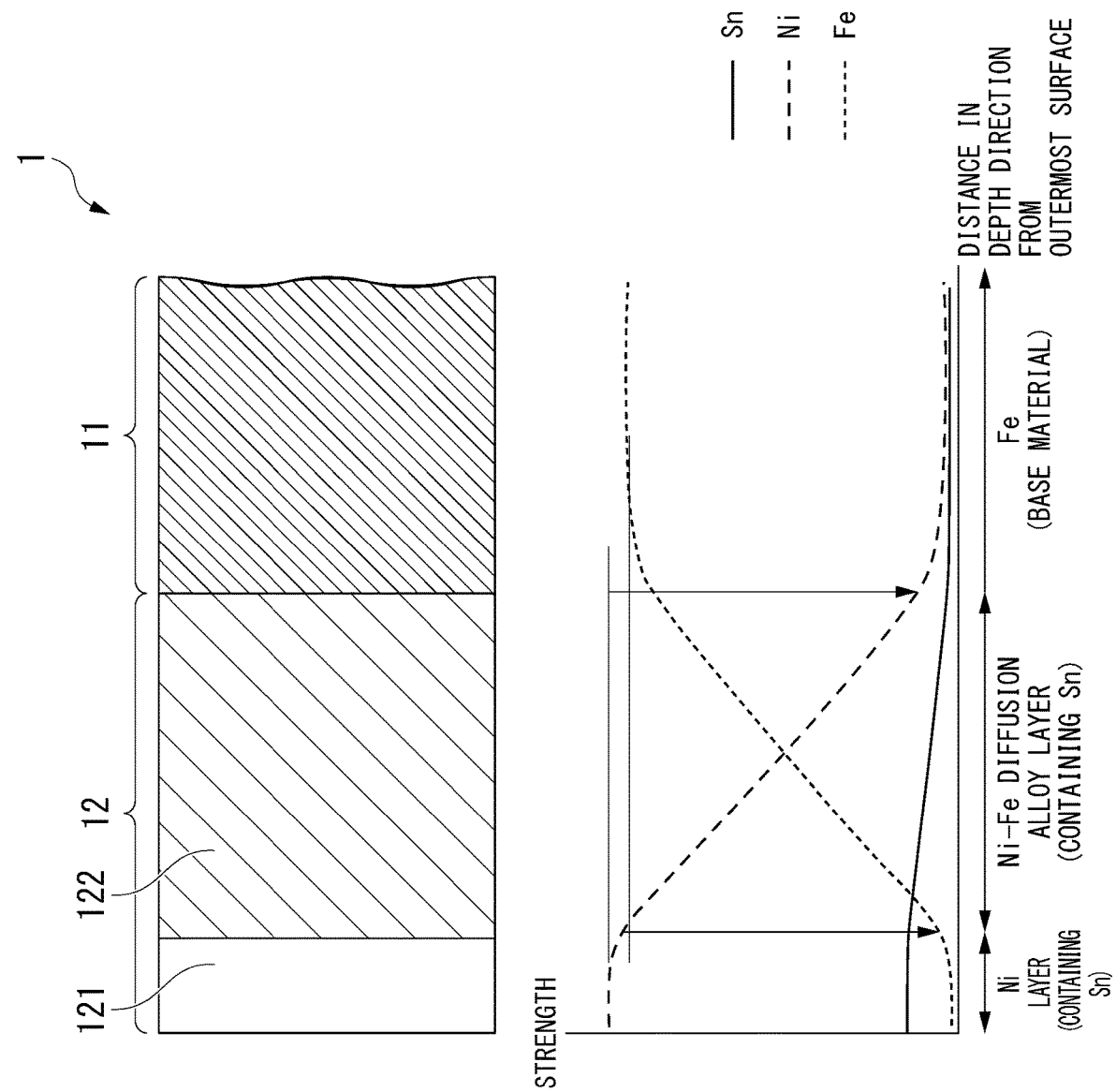

Ni-PLATED STEEL SHEET AND MANUFACTURING METHOD THEREOF

TECHNICAL FIELD OF THE INVENTION

The present invention relates to a Ni-plated steel sheet and a manufacturing method thereof.

Priority is claimed on Japanese Patent Application No. 2020-035830, filed in Japan on Mar. 3, 2020, the content of which is incorporated herein by reference.

RELATED ART

With the widespread use of portable electronic devices and xEVs (general term for EVs, hybrid vehicles, and plug-in hybrid vehicles), there is a demand for batteries that serve as power sources for these devices to reduce in size and increase in capacity. In order to reduce the sizes of batteries, there is a need to work surface-treated steel sheets constituting battery containers in a complicated manner. That is, surface-treated steel sheets constituting battery containers are required to have high workability.

Furthermore, in recent years, there has been a tendency for time taken from battery assembly to the first charge of batteries to be extended. This increases a risk of metal elution from container materials. This is because, while batteries are assembled and then charged for the first time, the container materials are in contact with LIB electrolytic solutions at a neutral potential and in a state where metal is likely to be eluted from the container materials. In a case where metal is eluted into the LIB electrolytic solution, there is a concern that the eluted metal may be re-precipitated in a dendritic shape in the process of the charge/discharge cycle and a short circuit may be caused. Therefore, it is desired to stabilize battery performance and extend the service lives of batteries by suppressing metal elution from container materials as much as possible.

However, according to the prior art, it is difficult to provide a steel material having both workability and metal elution resistance. For example, Patent Document 1 discloses a surface-treated steel sheet for a battery case in which a bismuth layer or a nickel-bismuth alloy layer is formed on at least one outermost layer. According to this technique, since bismuth metal has excellent alkali resistance, it is considered that there is no case where a plated layer component is eluted into an alkaline solution even when the plated layer is in contact with the alkaline solution for a long period of time. However, in Patent Document 1, no studies are made on the workability of the surface-treated steel sheet.

PRIOR ART DOCUMENT

Patent Document

[Patent Document 1] PCT International Publication No. WO 01/42537

DISCLOSURE OF THE INVENTION

Problems to be Solved by the Invention

An object of the present invention is to provide a Ni-plated steel sheet capable of suppressing metal elution in a corrosive environment and having favorable workability and a manufacturing method thereof.

Means for Solving the Problem

The gist of the present invention is as described below.

(1) A Ni-plated steel sheet according to one aspect of the present invention includes a base steel sheet and a Ni plating layer provided on a surface of the base steel sheet, the Ni plating layer includes a Ni—Fe alloy layer formed on the surface of the base steel sheet, and a ratio of a Sn content to a Ni content in the Ni plating layer is 0.0005% to 0.10%.

(2) In the Ni-plated steel sheet according to (1) above, the Ni—Fe alloy layer may be formed in a part of the Ni plating layer.

(3) In the Ni-plated steel sheet according to (1) above, the Ni—Fe alloy layer may be formed up to an outermost surface of the Ni plating layer.

(4) In the Ni-plated steel sheet according to any one of (1) to (3) above, the ratio of the Sn content to the Ni content in the Ni plating layer may be 0.0010% to 0.020%.

(5) In the Ni-plated steel sheet according to any one of (1) to (4) above, a Ni coating weight per one surface may be 1.34 to 35.60 g/m$^2$.

(6) In the Ni-plated steel sheet according to any one of (1) to (5) above, in an XRD profile obtained by XRD measurement of the Ni plating layer, a peak of a Ni—Sn intermetallic compound, a peak of a Fe—Sn intermetallic compound, and a peak of a Ni—Fe—Sn intermetallic compound may not be present.

(7) A manufacturing method of a Ni-plated steel sheet according to another aspect of the present invention is a manufacturing method of the Ni-plated steel sheet according to any one of (1) to (6) above, including: electroplating a base steel sheet using a Ni plating bath in which [Sn$^{2+}$]/[Ni$^{2+}$] is set to 0.0005% to 0.10% to obtain a material Ni-plated steel sheet; and annealing the material Ni-plated steel sheet.

(8) In the manufacturing method of the Ni-plated steel sheet according to (7) above, a current density in the electroplating may be set to 100 to 5000 A/m$^2$.

(9) In the manufacturing method of the Ni-plated steel sheet according to (7) or (8) above, a Ni coating weight per one surface in the material Ni-plated steel sheet may be set to 1.34 to 35.60 g/m$^2$.

Effects of the Invention

According to the present invention, it is possible to provide a Ni-plated steel sheet capable of suppressing metal elution in a severe corrosive environment, for example, an inner surface environment of a primary battery or a secondary battery or a fuel injection pipe and having favorable workability and a manufacturing method thereof.

BRIEF DESCRIPTION OF THE DRAWINGS

FIG. 1-1 is a conceptual diagram of a Ni-plated steel sheet according to the present embodiment, which has a partial diffusion layer.

FIG. 1-2 is a conceptual diagram of a Ni-plated steel sheet according to the present embodiment, which has a total diffusion layer.

FIG. 2 is a schematic diagram of a three-pole laminated cell for evaluation of metal elution resistance.

EMBODIMENTS OF THE INVENTION

The present inventors intensively studied means for improving the metal elution resistance of Ni-plated steel sheets while maintaining the same level of workability as conventional products. As a result, the present inventors found that it is effective to add an extremely small amount of Sn to a Ni plating layer of a Ni-plated steel sheet.

It has been conventionally known that a Ni—Sn alloy is used as a plated layer in a Ni-plated steel sheet for a battery can. However, in a case where the plated layer contains a large amount of Sn, the workability of the Ni-plated steel sheet is impaired due to a brittle Ni—Sn intermetallic compound.

On the other hand, the present inventors found that Sn that is contained in the Ni plating layer has a totally new action effect on improvement in the metal elution resistance of the Ni plating layer. Furthermore, it was clarified that the effect of Sn on metal elution resistance improvement is dramatically exhibited by adding an extremely small amount of Sn to the Ni plating layer.

Figures 1, 2:
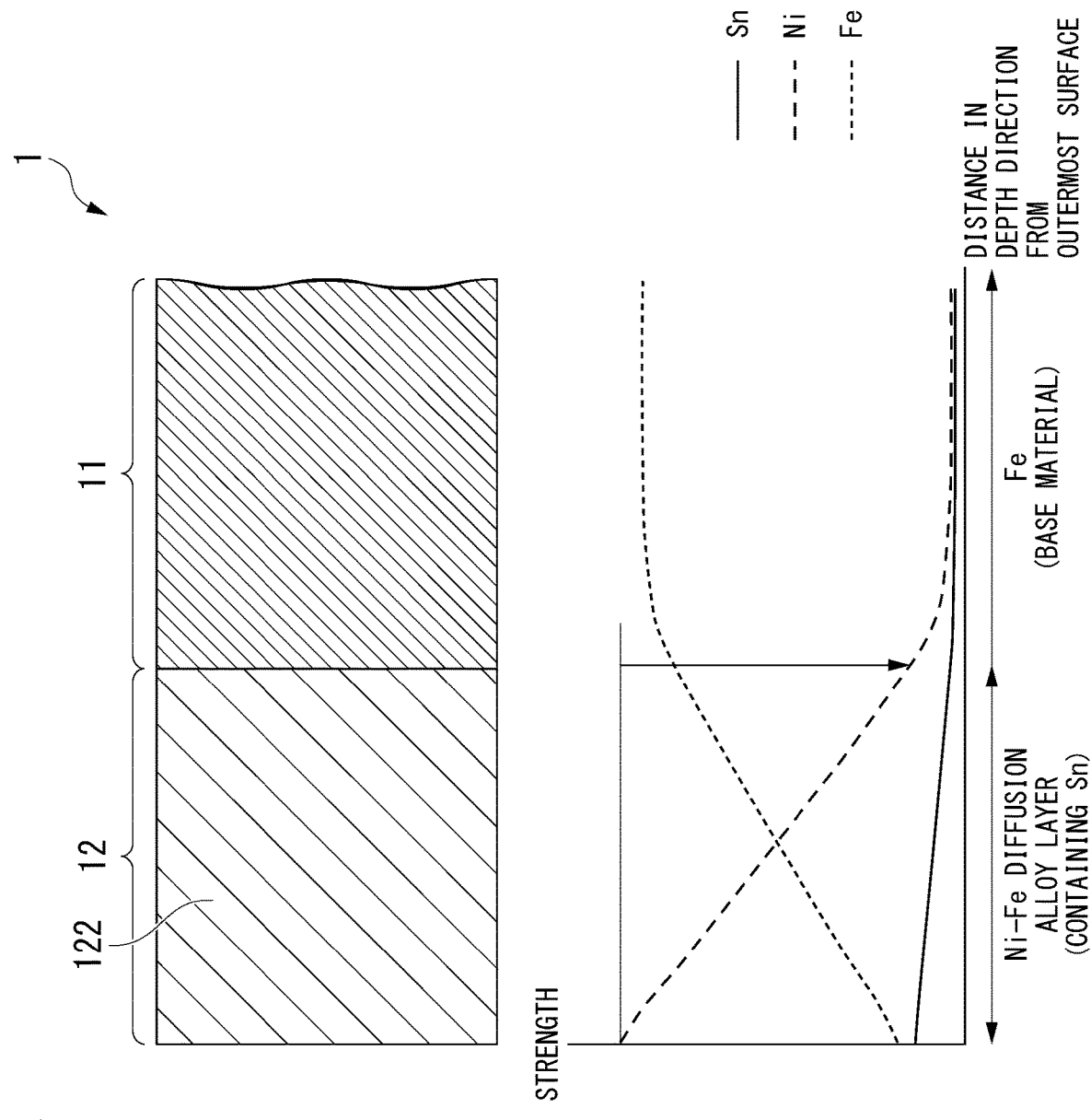
Figure 2:
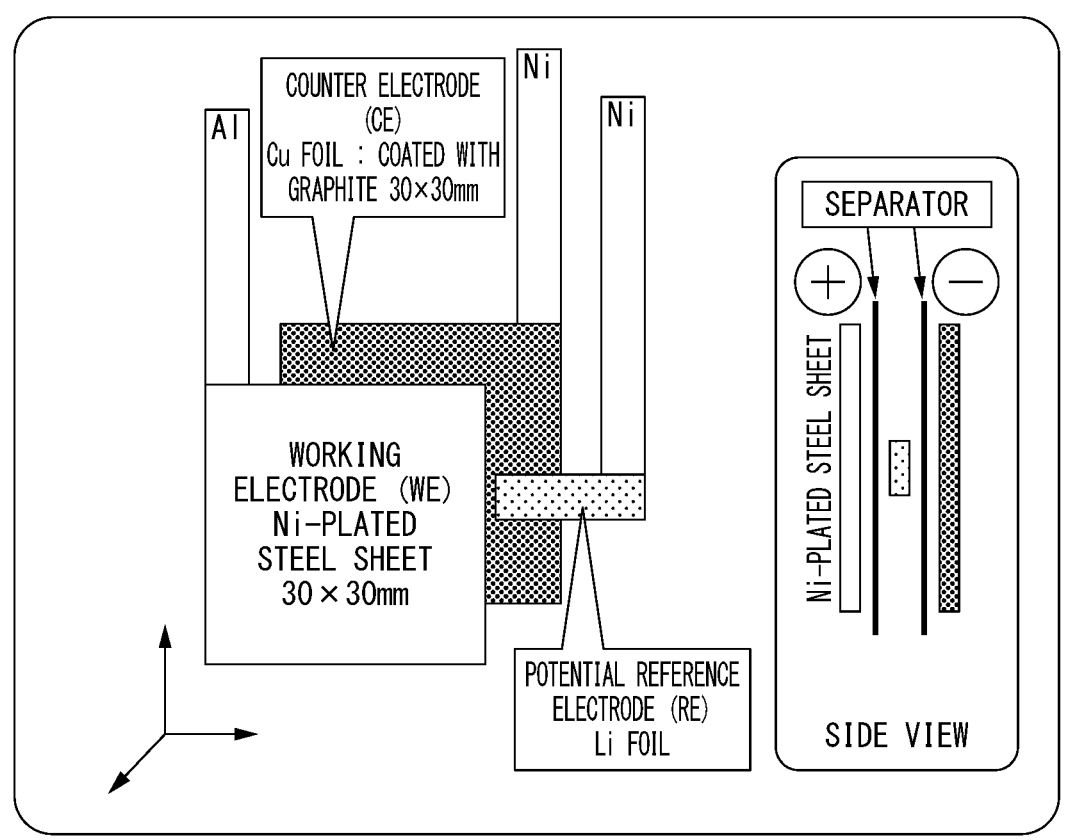

A Ni-plated steel sheet 1 according to the present embodiment obtained by the above-described findings includes, as shown in FIG. 1-1 and FIG. 1-2, a base steel sheet 11 and a Ni plating layer 12 provided on a surface of the base steel sheet, and the ratio of the Sn content to the Ni content in the Ni plating layer 12 is 0.0005% to 0.10%. Hereinafter, the Ni-plated steel sheet 1 according to the present embodiment will be described in detail.

(Base Steel Sheet 11)

The base steel sheet 11 is a steel sheet that serves as a base material of the Ni-plated steel sheet 1. The components, sheet thickness, metallographic structure, and the like of the base steel sheet 11 are not particularly limited. In a case where the base steel sheet 11 is used as a material of a battery container, for example, the base steel sheet 11 is preferably made of low-carbon aluminum killed steel, IF steel (interstitial free steel/ultra-low carbon steel), or the like. Specific examples of the chemical composition (mass %) of the base steel sheet 11 are as described below.

Example 1 Low-Carbon Aluminum Killed Steel

C: 0.057%, Si: 0.004%, Mn: 0.29%, P: 0.014%, S: 0.007%, Al: 0.050%, Cu: 0.034%, Ni: 0.021%, remainder: including iron and an impurity Example 2 IF Steel C: 0.004%, Si: 0.01%, Mn: 0.16%, P: 0.013%, S: 0.006%, Al: 0.029%, Cu: 0.027%, Ni: 0.022%, Ti: 0.013%, remainder: including iron and an impurity Example 3 IF Steel C: 0.0012%, Si: less than 0.01%, Mn: 0.16%, P: 0.013%, S: 0.006%, Al: 0.029%, Cu: 0.027%, Ni: 0.022%, Ti: 0.020%, remainder: including iron and an impurity The thickness of the base steel sheet 11 is also not particularly limited. In a case where the Ni-plated steel sheet 1 is used as, for example, a material of a battery container, the thickness of the base steel sheet 11 is preferably set to, for example, 0.15 mm to 0.8 mm.

(Ni Plating Layer 12)

The Ni plating layer 12 is formed on a surface of the base steel sheet 11. The Ni plating layer 12 may be disposed only on one surface of the base steel sheet 11 or may be disposed on both surfaces.

The Ni plating layer 12 includes a Ni—Fe alloy layer 122. The Ni—Fe alloy layer 122 may be formed on a part of the Ni plating layer 12 or may be formed up to the outermost surface of the Ni plating layer 12. The fact that the Ni—Fe alloy layer 122 is formed on a part of the Ni plating layer 12 is also referred to as partial diffusion, and the fact that the Ni—Fe alloy layer 122 is formed up to the outermost surface of the Ni plating layer 12 is also referred to as total diffusion.

The lower parts of FIG. 1-1 and FIG. 1-2 are graphs showing the relationships between the Sn strength, the Ni strength, and the Fe strength and the distance in the depth direction from the outermost surface in the case of performing glow discharge spectroscopy (GDS) from the surface of the Ni-plated steel sheet 1 toward the inside. In the present embodiment, a region from the outermost surface of the Ni plating layer 12 to a position where the Fe strength becomes $\frac{1}{10}$ of the Fe strength (maximum Fe strength) of the base metal is defined as a Ni layer 121. In addition, a region from the position where the Fe strength becomes $\frac{1}{10}$ of the maximum Fe strength to a position where the Ni strength becomes $\frac{1}{10}$ of the maximum value of the Ni strength (maximum Ni strength) in the Ni plating layer 12 is defined as the Ni—Fe alloy layer 122.

In a case where the diffusion of Fe does not reach the outermost surface of the Ni plating layer 12, the GDS result becomes as shown in FIG. 1-1, and the Ni plating layer 12 becomes a partial diffusion layer including the Ni layer 121 and the Ni—Fe alloy layer 122. In a case where Fe sufficiently diffuses up to the outermost surface of the Ni plating layer 12, the GDS result becomes as shown in FIG. 1-2, and the Ni plating layer 12 becomes a total diffusion layer not including the Ni layer 121. The Ni plating layer 12 of the Ni-plated steel sheet 1 according to the present embodiment may have any form. The Ni-plated steel sheet 1 may include both a partial diffusion layer and a total diffusion layer.

Determination of whether the Ni plating layer 12 is total diffusion or partial diffusion is determined from element distribution in the depth direction obtained by GDS. GDS measurement conditions are as described below.

Anode diameter: φ4 mm
Gas: Ar
Gas pressure: 600 Pa
Output: 35 W

The Ni plating layer where the Fe strength on the outermost surface is more than $\frac{1}{10}$ of the maximum Fe strength is regarded as total diffusion, and the Ni plating layer where the Fe strength is $\frac{1}{10}$ or less is regarded as partial diffusion. (Refer to FIG. 1-1 and FIG. 1-2)

The Ni plating layer 12 contains a small amount of Sn. The ratio of the Sn content to the Ni content (that is, a value obtained by dividing the Sn content by the Ni content) in the Ni plating layer 12 is within a range of 0.0005% to 0.10%. Here, the "Ni content" and the "Sn content" each mean the Ni coating weight and the Sn coating weight. Therefore, the ratio of the Sn content to the Ni content is the average value throughout the entire Ni plating layer 12.

When the ratio of the Sn content to the Ni content is set to 0.0005% or more, the metal elution resistance of the Ni-plated steel sheet 1 is dramatically improved. On the other hand, when the ratio of the Sn content to the Ni content is set to 0.10% or less, the formation of a brittle Ni—Sn intermetallic compound is suppressed, and it is possible to maintain the workability of the Ni-plated steel sheet 1 at the same level as the workability of normal Ni-plated steel sheets. When workability is ensured, it is also possible to suppress the generation of a plating defect and furthermore to ensure the metal elution resistance. The ratio of the Sn content to the Ni content may be set to 0.0007% or more, 0.0010% or more, 0.0012% or more, 0.0015% or more, 0.0020% or more, 0.0030% or more, 0.0040% or more, or 0.0050% or more. The ratio of the Sn content to the Ni content may be set to 0.090% or less, 0.040% or less, 0.020% or less, less than 0.020%, 0.019% or less, or 0.018% or less.

The ratio of the Sn content to the Ni content in the Ni plating layer 12 is measured by dividing the Sn coating weight by the Ni coating weight. The Ni coating weight in the Ni plating layer 12 is measured by ICP optical emission spectroscopy (ICP-OES). First, a predetermined area of the Ni plating layer 12 is dissolved in an acid. Next, the amount of Ni contained in the solution is quantitatively analyzed by ICP-OES. The amount of Ni quantified by ICP-OES is divided by the above-described predetermined area, whereby the Ni coating weight per unit area can be obtained. In addition, the Sn coating weight in the Ni plating layer 12 is measured by ICP mass spectrometry (ICP-MS). A predetermined area of the Ni plating layer 12 is dissolved in an acid. The amount of Sn contained in the solution is quantitatively analyzed by ICP-MS. The amount of Sn quantified by ICP-MS is divided by the above-described predetermined area, whereby the Sn coating weight per unit area can be obtained.

As long as the ratio of the Sn content to the Ni content is within the above-described range, the average composition, thickness, and the like of the Ni plating layer 12 are not particularly limited and can be appropriately set depending on the application of the Ni-plated steel sheet 1. The Ni plating layer 12 may contain an impurity to an extent that the characteristics are not impaired.

For example, the Ni coating weight per one surface of the Ni plating layer 12 may be set to 1.34 to 35.60 g/m$^2$. When the Ni coating weight in the Ni plating layer 12 is set to 1.34 g/m$^2$ or more, it is possible to reliably ensure the corrosion resistance of the Ni-plated steel sheet 1. When the Ni coating weight in the Ni plating layer 12 is set to 35.60 g/m$^2$ or less, it is possible to reduce the manufacturing cost of the Ni-plated steel sheet 1. In addition, when the Ni coating weight per one surface is more than 35.60 g/m$^2$, the hardness of the Ni plating layer 12 becomes excessive, and the workability is impaired. Furthermore, in this case, there is a case where cracks are induced in the Ni plating layer 12 due to internal stress. The Ni coating weight per one surface of the Ni plating layer 12 may be set to 1.78 g/m$^2$ or more or 2.67 g/m$^2$ or more. The Ni coating weight per one surface of the Ni-plated steel sheet 1 may be set to 13.35 g/m$^2$ or less or 8.9 g/m$^2$ or less. In addition, in a case where the Ni plating layer 12 is formed as a partial diffusion layer, the Ni coating weight per one surface of the Ni-plated steel sheet 1 is preferably set to 5.4 to 35.6 g/m$^2$. In a case where the Ni plating layer 12 is formed as a total diffusion layer, the Ni coating weight per one surface of the Ni-plated steel sheet 1 is preferably set to 1.34 to 5.4 g/m$^2$. In addition, the thickness of the Ni plating layer 12 is, for example, 0.1 to 10.0 m.

In the Ni plating layer 12, a Ni—Sn intermetallic compound, a Fe—Sn intermetallic compound, and a Ni—Fe—Sn intermetallic compound (hereinafter, these will be referred to as "intermetallic compounds") are desirably not present. Specifically, in an XRD profile obtained by the X-ray diffraction (XRD) measurement of the Ni plating layer 12, a peak of a Ni—Sn intermetallic compound, a peak of a Fe—Sn intermetallic compound, and a peak of a Ni—Fe—Sn intermetallic compound are preferably not present. This is because there is a concern that these intermetallic compounds may harden the Ni plating layer 12 and impair the workability.

The XRD measurement is performed under the following conditions.

Measuring instrument: SmartLab manufactured by Rigaku Corporation

Excited X-ray: Cu Kα

Voltage: 40 kV

Measurement angle (2θ): 35° to 105°

Next, a preferable manufacturing method of the Ni-plated steel sheet 1 according to the present embodiment will be described. However, Ni-plated steel sheets having the above-described requirements are regarded as the Ni-plated steel sheet 1 according to the present embodiment regardless of manufacturing methods thereof.

The manufacturing method of the Ni-plated steel sheet 1 according to the present embodiment includes electroplating S1 the base steel sheet using a Ni plating bath in which [Sn$^{2+}$]/[Ni$^{2+}$] is set to 0.0005% to 0.10% at a current density set to 100 to 5000 A/m$^2$ to obtain a material Ni-plated steel sheet, and annealing S2 the material Ni-plated steel sheet.

In the electroplating Si, Ni plating is performed on the base steel sheet 11 to obtain a material Ni-plated steel sheet. In the present embodiment, the unalloyed Ni-plated steel sheet that is obtained after the Ni plating will be referred to as the material Ni-plated steel sheet. In the Ni plating bath that is used for the electro plating, [Sn$^{2+}$]/[Ni$^{2+}$] is set to that is used for the electro plating, [Sn$^{2+}$]/[Ni$^{2+}$] is set to 0.0005% to 0.10%. [Sn$^{2+}$] is the concentration (g/L) of Sn that is contained in the Ni plating bath in a Sn$^{2+}$ form, and [Ni$^{2+}$] is the concentration (g/L) of Ni that is contained in the Ni plating bath in a Ni$^{2+}$ form. When [Sn$^{2+}$]/[Ni$^{2+}$] is set within a range of 0.0005% to 0.10%, it is possible to set the ratio of the Sn content to the Ni content in the Ni plating within a range of 0.0005% to 0.10%. In addition, this proportion is maintained even after the annealing S2 is subsequently performed.

As long as [Sn$^{2+}$]/[Ni$^{2+}$] is set within the above-described range, the composition of the Ni plating bath is not particularly limited. In addition, electro plating conditions are not particularly limited and can be appropriately selected depending on a required Ni coating weight. The Ni coating weight of the material Ni-plated steel sheet is preferably set to 1.34 to 35.60 g/m$^2$ per one surface. In such a case, it is possible to set the Ni coating weight per one surface of the Ni-plated steel sheet 1 that is obtained after the annealing S2 to 1.34 to 35.60 g/m$^2$. A preferable Ni coating weight per one surface of the material Ni-plated steel sheet is based on the above-described preferable Ni coating weight per one surface of the Ni-plated steel sheet 1. The current density is preferably set within a range of 100 to 5000 A/m$^2$. When the current density is set to 100 A/m$^2$ or more, a preferable Ni coating weight can be set. When the current density is set to 5000 A/m$^2$ or less, it is possible to prevent plated surface burn or the like.

In the subsequent annealing S2, the material Ni-plated steel sheet is annealed, and the Ni plating is alloyed. This causes interdiffusion of Ni and Fe between the Ni plating and the base steel sheet 11 and forms the Ni plating layer 12. Annealing conditions are not particularly limited and can be appropriately selected depending on the film thickness of the Ni plating. Examples thereof include a heat pattern in which the material Ni-plated steel sheet is heated from 25° C. to 720° C. at an average temperature increase velocity of 20° C./sec in N$_2$-4% H$_2$, held at 720° C. for 20 seconds, and then cooled to 300° C. at an average cooling rate of 30° C./sec, in order for additional promotion of diffusion, a heat pattern in which the material Ni-plated steel sheet is heated from 25° C. to 830° C. at an average temperature increase velocity of 15° C./sec in $N_2$-4% $H_2$, held at 830° C. for 60 seconds, and then cooled to 300° C. at an average cooling rate of 20° C./sec, and the like.

As described above, the Ni-plated steel sheet in the present embodiment satisfies both metal elution resistance and workability by adding a small amount of Sn to the Ni plating layer. The Ni-plated steel sheet in the present embodiment is suitable as a material for which not only metal elution resistance but also workability are required. The applications of the Ni-plated steel sheet in the present embodiment are not particularly limited, and the Ni-plated steel sheet can be suitably used, for example, as a battery can that is exposed to a severe corrosive environment such as the inner surface environment of a primary battery or a secondary battery or as a fuel pipe through which fuel passes.

EXAMPLES (Relationship Between Sn Concentration in Ni Plating Layer and Metal Elution Resistance and Workability of Ni-Plated Steel Sheet)

A plurality of Ni-plated steel sheets were manufactured using base steel sheets (Table 4) with a variety of Ni plating bath compositions (Table 1), Ni electrolysis conditions (Table 2), and annealing conditions (Table 3), and the metal elution resistance and workability thereof were evaluated. To produce the Ni plating baths, $H_2SO_4$ with a content of 96% or more, boric acid with a content of 99.5% or more, and $SnSO_4$ with a content of 93% by mass or more were used.

TABLE 1

| | Bath composition g/L | | | | Metal ion concentration in plating solution | | |
|---|---|---|---|---|---|---|---|
| | $NiSO_4 \cdot 6H_2O$ | $H_2SO_4$ | Boric acid | $SnSO_4$ | $Ni^{2+}$ g/L | $Sn^{2+}$ g/L | $[Sn^{2+}]/[Ni^{2+}]$ % |
| A bath | 230 | 0.5 | 45 | 0 | 51.4 | 0.00000 | 0.0000 |
| B bath | 230 | 0.5 | 45 | 0.00033 | 51.4 | 0.00018 | 0.0004 |
| C bath | 230 | 0.5 | 45 | 0.00067 | 51.4 | 0.00037 | 0.0007 |
| D bath | 230 | 0.5 | 45 | 0.001 | 51.4 | 0.00055 | 0.0011 |
| E bath | 230 | 0.5 | 45 | 0.0033 | 51.4 | 0.0018 | 0.0036 |
| F bath | 230 | 0.5 | 45 | 0.0067 | 51.4 | 0.0037 | 0.0072 |
| G bath | 230 | 0.5 | 45 | 0.01 | 51.4 | 0.0055 | 0.011 |
| H bath | 230 | 0.5 | 45 | 0.033 | 51.4 | 0.018 | 0.036 |
| I bath | 230 | 0.5 | 45 | 0.067 | 51.4 | 0.037 | 0.072 |
| J bath | 230 | 0.5 | 45 | 0.1 | 51.4 | 0.055 | 0.11 |

TABLE 2

| | Current density $A/m^2$ | Total energization amount $C/m^2$ |
|---|---|---|
| Electrolysis condition 1 | 1000 | 5000 |
| Electrolysis condition 2 | 100 | 10000 |
| Electrolysis condition 3 | 1000 | 10000 |
| Electrolysis condition 4 | 5000 | 10000 |
| Electrolysis condition 5 | 1000 | 30000 |
| Electrolysis condition 6 | 1000 | 60000 |
| Electrolysis condition 7 | 1000 | 90000 |
| Electrolysis condition 8 | 100 | 120000 |
| Electrolysis condition 9 | 1000 | 120000 |
| Electrolysis condition 10 | 5000 | 120000 |
| Electrolysis condition 11 | 1000 | 130000 |

TABLE 3

| | Atmosphere in furnace | Average temperature increase velocity (25° C. to soaking temperature) | Soaking temperature | Soaking time | Average cooling rate (soaking temperature to 300° C.) |
|---|---|---|---|---|---|
| Annealing condition 1 | $N_2$—4%$H_2$ | 20° C./sec | 720° C. | 20 sec | 30° C./sec |
| Annealing condition 2 | $N_2$—4%$H_2$ | 15° C./sec | 830° C. | 60 sec | 20° C./sec |

TABLE 4

| Steel type | Components |
|---|---|
| Al—K | C: 0.057, Si: 0.004, Mn: 0.29, P: 0.014, S: 0.007, remainder: including iron and impurity |
| IF | C: 0.0012, Si: less than 0.01, Mn: 0.29, P: 0.014, S: less than 0.001, remainder: including iron and impurity |

The ratio of the Sn content to the Ni content (the Sn content rate in the amount of a Ni plating) in the Ni plating layer of each sample was obtained by dividing the Sn coating weight by the Ni coating weight. A predetermined amount of the Ni plating layer in each sample was dissolved in an acid, the amount of Ni in the solution was measured by ICP-OES, and the amount of Sn was measured by ICP-MS.

Determination of whether the Ni plating layer in each sample was total diffusion or partial diffusion was determined from element distribution in the depth direction obtained by glow discharge spectroscopy (GDS). A high-frequency glow discharge optical emission surface analyzer (manufactured by Horiba, Ltd., Model No.: GD-Profiler 2) was used for the measurement. GDS measurement conditions were as described below.

Anode diameter: (φ4 mm

Gas: Ar

Gas pressure: 600 Pa

Output: 35 W

The Ni plating layer where the Fe strength on the outermost surface was more than 1/10 of the maximum Fe strength was regarded as total diffusion, and the Ni plating layer where the Fe strength was 1/10 or less was regarded as partial diffusion. (Refer to FIG. 1-1 and FIG. 1-2)

The metal elution resistance of each sample was evaluated by an elution test in which a three-electrode laminated cell shown in FIG. 2 was used. This three-electrode laminated cell included a working electrode WE, a counter electrode CE, and a potential reference electrode RE disposed between them. A separator was inserted between these electrodes. These electrodes and separators were disposed in a laminated cell filled with an electrolytic solution. The details of the elution test in which the three-electrode laminated cell was used are as shown in Table 5. The metal elution resistance of the Ni-plated steel sheet was evaluated with the anode current value. Specifically, when the anode current was less than $3 \times 10^{-6}$ A/cm$^2$, the metal elution resistance was evaluated as A, when the anode current was 3 to $10 \times 10^{-6}$ A/cm$^2$, the metal elution resistance was evaluated as B, and, when the anode current was more than $10 \times 10^{-6}$ A/cm$^2$, the metal elution resistance was evaluated as C.

TABLE 5

| Working electrode WE | Ni-plated steel sheet (30 mm in length and width, end face coated with resin) |
|---|---|
| Counter electrode CE | Graphite electrode (30 mm in length and width, graphite for lithium ion battery (LIB) applied to surface of Cu foil) |
| Potential reference electrode RE | Li foil |
| Solvent in electrolytic solution | Liquid mixture of ethylene carbonate (EC) and ethyl methyl carbonate (EMC) (EC:EMC = 1:3) |
| Electrolyte in electrolytic solution | Lithium hexafluorophosphate (LiPF$_6$) 1 mol/L |
| Measurement environment temperature | 45° C. |
| Potential sweep velocity | 5 mV/sec |
| Potential upon measurement of anode current value | 3.8 V |

Whether or not the Ni-plated steel sheet had an intermetallic compound was determined by whether or not, in an XRD profile obtained by the X-ray diffraction (XRD) measurement, a peak of a Ni—Sn intermetallic compound, a peak of a Fe—Sn intermetallic compound, and a peak of a Ni—Fe—Sn intermetallic compound were present.

The XRD measurement was performed under the following conditions.

Measuring instrument: SmartLab manufactured by Rigaku Corporation

Excited X-ray: Cu Kα

Voltage: 40 kV

Measurement angle (2θ): 35° to 105°

The workability of each sample was evaluated with the plated surface hardness. The plated surface hardness was obtained by measuring Vickers hardness using a micro hardness meter (manufactured by Mitutoyo Corporation, Model No.: HM-200) and a diamond indenter with a load of 5 g and a retention time of 10 seconds. Measurement was performed four times on the same sample, and the average value was adopted. As the plated surface hardness became lower, the workability was determined to be more favorable. When Hv 5 g was less than 190, the workability was evaluated as A, when Hv 5 g was 190 to 220, the workability was evaluated as B, and, when Hv 5 g was more than 220, the workability was evaluated as C.

Table 6 shows the results of polarization measurement in LIB electrolytic solutions and workability. At levels 1 and 2, the Sn content rate in the Ni plating was low, and the metal elution resistance was poor. At a level 10, the Sn content rate in the Ni plating was high, and the metal elution resistance and the workability were poor. On the other hand, in present invention examples, the metal elution resistance and the workability were highly balanced. In addition, as a result of performing XRD measurement on levels 3 to 5, a peak of a Ni—Sn intermetallic compound, a peak of a Fe—Sn intermetallic compound, and a peak of a Ni—Fe—Sn intermetallic compound were not present.

TABLE 6

| | Manufacturing conditions | | | | Product specification | | | Evaluation | | | |
|---|---|---|---|---|---|---|---|---|---|---|---|
| | Steel type | Ni plating bath composition | Ni electrolysis condition | Annealing condition | Ni coating weight g/m² | Sn content rate in Ni plating % | Total diffusion or partial diffusion | Metal elution resistance (in LIB) × 10⁻⁶ A/cm² | | Workability plating hardness Hv 5 g | |
| Level 1 | Al—K | A bath | Electrolysis condition 6 | Annealing condition 1 | 16.6 | 0 | Partial diffusion | 12 | C | 140 | A | Comparative Example |
| Level 2 | Al—K | B bath | Electrolysis condition 6 | Annealing condition 1 | 16.5 | 0.0004 | Partial diffusion | 10.5 | C | 155 | A | Comparative Example |
| Level 3 | Al—K | C bath | Electrolysis condition 6 | Annealing condition 1 | 16.4 | 0.0007 | Partial diffusion | 6.4 | B | 160 | A | Example |
| Level 4 | Al—K | D bath | Electrolysis condition 6 | Annealing condition 1 | 16.5 | 0.0009 | Partial diffusion | 4.8 | B | 160 | A | Example |
| Level 5 | Al—K | E bath | Electrolysis condition 6 | Annealing condition 1 | 16.4 | 0.0034 | Partial diffusion | 3.5 | B | 170 | A | Example |
| Level 6 | Al—K | F bath | Electrolysis condition 6 | Annealing condition 1 | 16.4 | 0.0072 | Partial diffusion | 2.6 | A | 170 | A | Example |
| Level 7 | Al—K | G bath | Electrolysis condition 6 | Annealing condition 1 | 16.3 | 0.012 | Partial diffusion | 1.6 | A | 175 | A | Example |
| Level 8 | Al—K | H bath | Electrolysis condition 6 | Annealing condition 1 | 16.4 | 0.038 | Partial diffusion | 2.5 | A | 180 | A | Example |
| Level 9 | Al—K | I bath | Electrolysis condition 6 | Annealing condition 1 | 16.3 | 0.092 | Partial diffusion | 5.8 | B | 210 | B | Example |
| Level 10 | Al—K | J bath | Electrolysis condition 6 | Annealing condition 1 | 16.2 | 0.11 | Partial diffusion | 11 | C | 230 | C | Comparative Example |
| Level 11 | Al—K | G bath | Electrolysis condition 1 | Annealing condition 1 | 1.37 | 0.02 | Total diffusion | 8.9 | B | 205 | B | Example |
| Level 12 | Al—K | G bath | Electrolysis condition 2 | Annealing condition 1 | 2.75 | 0.019 | Total diffusion | 6.2 | B | 200 | B | Example |
| Level 13 | Al—K | G bath | Electrolysis condition 3 | Annealing condition 1 | 2.74 | 0.018 | Total diffusion | 7.1 | B | 195 | B | Example |
| Level 14 | Al—K | G bath | Electrolysis condition 4 | Annealing condition 1 | 2.70 | 0.017 | Total diffusion | 7.9 | B | 195 | B | Example |
| Level 15 | Al—K | G bath | Electrolysis condition 5 | Annealing condition 1 | 8.21 | 0.016 | Partial diffusion | 2.9 | A | 175 | A | Example |
| Level 16 | Al—K | G bath | Electrolysis condition 7 | Annealing condition 1 | 24.6 | 0.014 | Partial diffusion | 1.6 | A | 170 | A | Example |
| Level 17 | Al—K | G bath | Electrolysis condition 8 | Annealing condition 1 | 32.9 | 0.015 | Partial diffusion | 1.4 | A | 175 | A | Example |
| Level 18 | Al—K | G bath | Electrolysis condition 9 | Annealing condition 1 | 32.6 | 0.012 | Partial diffusion | 1.5 | A | 180 | A | Example |
| Level 19 | Al—K | G bath | Electrolysis condition 10 | Annealing condition 1 | 32.5 | 0.011 | Partial diffusion | 1.8 | A | 180 | A | Example |
| Level 20 | Al—K | G bath | Electrolysis condition 11 | Annealing condition 1 | 35.6 | 0.01 | Partial diffusion | 2.4 | A | 195 | B | Example |
| Level 21 | IF | G bath | Electrolysis condition 6 | Annealing condition 1 | 16.3 | 0.011 | Partial diffusion | 1.7 | A | 165 | A | Example |
| Level 22 | IF | G bath | Electrolysis condition 6 | Annealing condition 2 | 16.4 | 0.011 | Partial diffusion | 1.6 | A | 135 | A | Example |

INDUSTRIAL APPLICABILITY

The present invention can be used for battery cans or fuel pipes for which not only metal elution resistance but also workability are required. The present invention is capable of providing a Ni-plated steel sheet capable of suppressing metal elution in a severe corrosive environment, for example, an inner surface environment of a primary battery or a secondary battery and having favorable workability and a manufacturing method thereof and is thus extremely industrially applicable.

BRIEF DESCRIPTION OF THE REFERENCE SYMBOLS

1 Ni-plated steel sheet
11 Base steel sheet
12 Ni plating layer
121 Ni layer
122 Ni—Fe alloy layer
WE Working electrode
CE Counter electrode
Li Electrical standard foil
S Separator

The invention claimed is:

1. A Ni-plated steel sheet comprising:
    a base steel sheet; and
    a Ni plating layer provided on a surface of the base steel sheet,
    wherein the Ni plating layer includes a Ni—Fe alloy layer formed on the surface of the base steel sheet, and
    a weight ratio of Sn content to Ni content in the Ni plating layer is 0.0005% to 0.040%.

2. The Ni-plated steel sheet according to claim 1,
    wherein the Ni—Fe alloy layer is formed in a part of the Ni plating layer.

3. The Ni-plated steel sheet according to claim 1,
wherein the Ni—Fe alloy layer is formed up to an outermost surface of the Ni plating layer.

4. A Ni-plated steel sheet comprising:
a base steel sheet; and
a Ni plating layer provided on a surface of the base steel sheet,
wherein the Ni plating layer includes a Ni—Fe alloy layer formed on the surface of the base steel sheet, and
wherein a weight ratio of Sn content to Ni content in the Ni plating layer is 0.0010% to 0.020%.

5. The Ni-plated steel sheet according to claim 1,
wherein a Ni coating weight per one surface is 1.34 to 35.60 g/m$^2$.

6. The Ni-plated steel sheet according to claim 1,
wherein, in an XRD profile obtained by XRD measurement of the Ni plating layer, a peak of a Ni—Sn intermetallic compound, a peak of a Fe—Sn intermetallic compound, and a peak of a Ni—Fe—Sn intermetallic compound are not present.

7. A manufacturing method of the Ni-plated steel sheet according to claim 1, comprising:
electroplating a base steel sheet using a Ni plating bath in which [$Sn^{2+}$]/[$Ni^{2+}$] is set to 0.0005% to 0.040% by weight to obtain a material Ni-plated steel sheet; and
annealing the material Ni-plated steel sheet.

8. The manufacturing method of the Ni-plated steel sheet according to claim 7,
wherein a current density in the electroplating is set to 100 to 5000 A/m$^2$.

9. The manufacturing method of the Ni-plated steel sheet according to claim 7,
wherein a Ni coating weight per one surface in the material Ni-plated steel sheet is set to 1.34 to 35.60 g/m$^2$.

10. The Ni-plated steel sheet according to claim 1,
wherein the Ni-plated steel sheet consists of the base steel sheet and the Ni plating layer.

11. The Ni-plated steel sheet according to claim 1,
wherein the weight ratio of Sn content to Ni content in the Ni plating layer is 0.0005% to 0.018%.

* * * * *